United States Patent
Medles et al.

(10) Patent No.: US 12,550,091 B2
(45) Date of Patent: Feb. 10, 2026

(54) TIMING AND FREQUENCY COMPENSATION IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Hsinchu (GB)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 328 days.

(21) Appl. No.: 18/552,702

(22) PCT Filed: Apr. 12, 2022

(86) PCT No.: PCT/CN2022/086221
§ 371 (c)(1),
(2) Date: Sep. 27, 2023

(87) PCT Pub. No.: WO2022/218275
PCT Pub. Date: Oct. 20, 2022

(65) Prior Publication Data
US 2024/0163826 A1    May 16, 2024

Related U.S. Application Data

(60) Provisional application No. 63/173,538, filed on Apr. 12, 2021.

(51) Int. Cl.
*H04W 56/00* (2009.01)
*H04B 7/01* (2006.01)
*H04B 7/185* (2006.01)

(52) U.S. Cl.
CPC .......... *H04W 56/0045* (2013.01); *H04B 7/01* (2013.01); *H04B 7/18513* (2013.01)

(58) Field of Classification Search
CPC ............... H04W 56/0045; H04W 56/0055; H04B 7/01; H04B 7/1851; H04B 7/18513; H04B 7/1853
See application file for complete search history.

(56) References Cited

U.S. PATENT DOCUMENTS

| 9,345,029 B2 * | 5/2016 | Monte | H04J 3/10 |
| 11,805,518 B2 * | 10/2023 | Yeo | H04L 1/1854 |

(Continued)

FOREIGN PATENT DOCUMENTS

| CN | 111800852 A | 10/2020 |
| WO | 2020/192788 A1 | 10/2020 |
| WO | 2021/032453 A1 | 2/2021 |

OTHER PUBLICATIONS

International Search Report and Written Opinion dated Jun. 14, 2022, issued in application No. PCT/CN2022/086221.

(Continued)

*Primary Examiner* — Bailor C Hsu
(74) *Attorney, Agent, or Firm* — McClure, Qualey & Rodack, LLP

(57) ABSTRACT

Various solutions for time and frequency in non-terrestrial network (NTN) communications are proposed. An apparatus implemented in a user equipment (UE) obtains a center frequency and a reference time of a non-terrestrial network. The apparatus further obtains a feeder link delay of a feeder link between a network node and a satellite, and a service link delay drift rate of a service link between the apparatus and the satellite. Then, the apparatus performs an uplink frequency pre-compensation through calculating an uplink transmit frequency according to the center frequency, the reference time, the feeder link delay, and the service link delay drift rate.

20 Claims, 5 Drawing Sheets

(56) References Cited

U.S. PATENT DOCUMENTS

| | | | |
|---|---|---|---|
| 11,943,043 B2* | 3/2024 | Wang | H04W 24/02 |
| 2022/0086780 A1* | 3/2022 | Tsai | H04W 56/006 |
| 2023/0337161 A1* | 10/2023 | Ma | H04W 56/0045 |
| 2023/0362857 A1* | 11/2023 | Ghanbarinejad | H04W 56/0045 |

OTHER PUBLICATIONS

Nokia, et al.; ;Discussion on time and frequency synchronization for NTN systems; 3GPP TSG RAN WG1 #103; R1-2009243; Nov. 2020; pp. 1-11.

* cited by examiner

TIMING AND FREQUENCY COMPENSATION IN NON-TERRESTRIAL NETWORK COMMUNICATIONS

CROSS REFERENCE TO RELATED PATENT APPLICATION(S)

The present disclosure is part of a non-provisional application claiming the priority benefit of U.S. Provisional Patent Application No. 63/173,538, filed 12 Apr. 2021, the content of which being incorporated by reference in its entirety.

TECHNICAL FIELD

The present disclosure is generally related to mobile communications and, more particularly, to timing and frequency compensation in non-terrestrial network (NTN) communications.

BACKGROUND

Unless otherwise indicated herein, approaches described in this section are not prior art to the claims listed below and are not admitted as prior art by inclusion in this section.

In NTN communications, in order to compensate for propagation delay and Doppler shift in wireless communications over a link, a user equipment (UE) needs to be aware of certain information. For example, the UE needs to know its UE position (e.g., via Global Navigation Satellite System (GNSS) positioning or a known position), the position and velocity of a satellite (or other flying object(s)) functioning as part of the NTN communications, and a time reference with respect to the position and velocity of the satellite. In case the satellite is a reference point, there would be no need for the UE to obtain information on a feeder link between a land-based network node (e.g., base station) and the satellite. In case the propagation delay includes the feeder link, the UE would need to know either the position of the land-based network node or information related to the feeder link (e.g., feeder link delay and delay drift rate). In case there is switching delay due to processing at the satellite, the UE would also need to know the switching delay.

The satellite links may have some impacts on signals transmitted by the UE. For example, Doppler shift on the service link, feeder link delay, service link delay, feeder link delay drift rate, and service link delay drift rate. Assuming the Doppler shift in the feeder link is perfectly compensated, the Doppler shift in the service link is a result of the service delay drift impact to the carrier frequency.

In addition, the UE uses the DL timing as a reference time, however, the DL timing has a delay itself, and the DL timing is a sum of a reference time, the service link delay, and the feeder link delay. Thus, the reception of the UL at base station has to correspond to reference time, and the UL pre-compensation needs to ensure that the timing is well pre-compensated. Similarly, the frequency of the UL received at the satellite also has to match reference frequency.

Not compensating the delay drift will lead to phase distortion of the signal which degrades base station demodulation performance. The phase distortion will lead to demodulation SINR degradation. The degradation due to feeder link delay drift is not a problem for initial access. However, for connected mode, the feeder link drift rate has to be known to the UE to avoid performance degradation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure are believed to address issues pertaining to timing compensation in NTN communications.

In one aspect, a method may involve an apparatus obtaining a center frequency and a reference time of a non-terrestrial network (NTN). The method may also involve the apparatus obtaining a feeder link delay of a feeder link between a network node and a satellite and obtaining a service link delay drift rate of a service link between the apparatus and the satellite. The method may also involve the apparatus performing an uplink (UL) frequency pre-compensation through calculating an uplink transmit frequency according to the center frequency, the reference time, the feeder link delay, and the service link delay drift rate.

In another aspect, an apparatus may include a transceiver and a processor coupled to the transceiver. The transceiver may be configured to wirelessly communicate with a non-terrestrial network (NTN). The processor may be configured to obtain, via the transceiver, a center frequency and a reference time of a non-terrestrial network (NTN). The processor may be configured to obtain, via the transceiver, a feeder link delay of a feeder link between a network node and a satellite and a service link delay drift rate of a service link between the apparatus and the satellite. The processor may also be configured to perform, via the transceiver, an uplink (UL) frequency pre-compensation through calculating an uplink transmit frequency according to the center frequency, the reference time, the feeder link delay, and the service link delay drift rate.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT), non-terrestrial network (NTN) and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to timing compensation in NTN communications. According to the present disclosure, a number of possible solutions may be implemented separately or jointly. That is, although these possible solutions may be described below separately, two or more of these possible solutions may be implemented in one combination or another.

Figure 1:
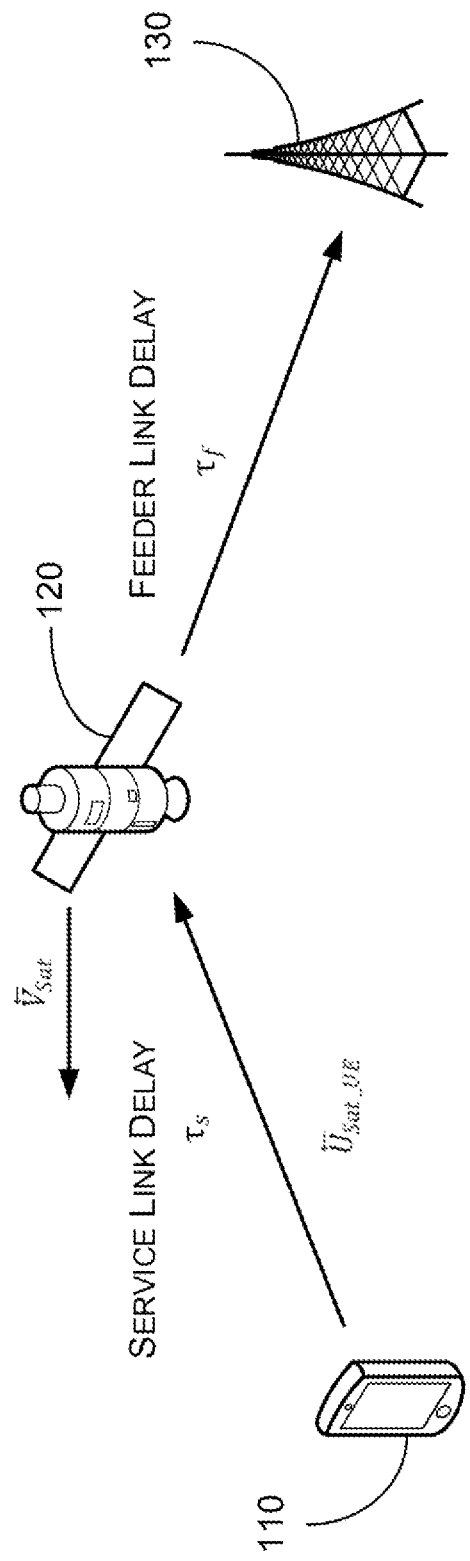
FIG. 1 is a diagram of an example network environment in which various proposed schemes in accordance with the present disclosure may be implemented.

FIG. 1 illustrates an example network environment 100 in which various proposed schemes in accordance with the present disclosure may be implemented. Network environment 100 involves UE 110, non-terrestrial (NT) network node 120 (e.g., a satellite) and terrestrial network node 130 (e.g., a gateway, base station, eNB, gNB or transmission/reception point (TRP)), which may be a part of a wireless communication network (e.g., an LTE network, a 5G network, an NR network, an IoT network, an NB-IoT network, an IIoT network, an NTN network or a 6G network). UE 110 may be far from terrestrial network node 130 (e.g., not within the communication range of terrestrial network node 130) and not able to communicate with terrestrial network node 130 directly. Via NTN, UE 110 may be able to transmit/receive signals to/from NT network node 120. NT network node 120 may relay/transfer signals/data from UE 110 to terrestrial network node 130. Thus, terrestrial network node 130 may be able communicate with UE 110 via NT network node 120. Since NT network node 120 is far from UE 110, propagation delay and Doppler frequency shift may be significant.

In non-terrestrial communication, satellite links (e.g., service link and feeder link) have impacts including Doppler frequency shift, feeder link delay $\tau_f$, service link delay $\tau_s$, feeder link delay drift $d_f$ and service link delay drift $d_s$ on signals transmitted by the UE.

Furthermore, UE 110 always synchronizes to the downlink (DL) and uses the DL as a reference. However, the DL itself has a delay $t_{DL}=t_{ABS}+\tau_s+\tau_f$. The reception time of the UL at terrestrial network node 130 has to correspond to reference time $t_{ABS}$. Similarly, the frequency of the UL received at the NT network node 120 also has to match reference frequency $f_0$. However, not compensating feeder link delay drift $d_f$ and service link delay drift $d_s$ will lead to phase distortion of the signal which degrades terrestrial network node 130 demodulation performance. Besides, the distortion will lead to demodulation SINR degradation, and the demodulation SNR degradation is small for low SNR. Given SIB performance is targeted for coverage with SNR≤−5 dB, the degradation due to feeder link delay drift $d_f$ is not a problem for initial access, but for connected mode, the feeder link delay drift $d_f$ has to be known to the UE to avoid performance degradation.

In view of the above, the present disclosure proposes a number of schemes pertaining to timing and frequency compensation/synchronization in NTN communications with respect to the UE 110, NT network node 120 and terrestrial network node 130. Under various proposed schemes in accordance with the present disclosure, each of the UE 110, the NT network node 120 and the terrestrial network node 130 may be configured to perform operations pertaining to the center frequency, the reference time, the feeder link delay, and the service link delay drift rate for uplink (UL) frequency pre-compensation in NTN communications, as described below.

UE 110 may obtain a center frequency and a reference time of NTN. Additionally, UE 110 may obtain the feeder link delay of the feeder link between the NT network node 120 and the terrestrial network node 130. Also, UE 110 may obtain the service link delay drift rate of the service link between the NT network node 120 and the UE 110. The feeder link delay may be indicated or broadcast by the terrestrial network node 130 and signalled to UE 110 by the NT network node 120 or may be derived. The service link delay drift rate may be signaled to UE 110 by the NT network node 120.

The center frequency and the reference time may be broadcast by the terrestrial network node 130 in a system information block (SIB). In an event that the SIB is an existing SIB, the center frequency and the reference time may be added to an information element (IE) definition for the existing SIB. In an event that the SIB is a new SIB, a new IE may be defined for the new SIB that includes the center frequency and the reference time.

UE 110 may perform UL frequency pre-compensation through calculating UL transmit frequency according to the center frequency, the reference time, the feeder link delay, and the service link delay drift rate. Specifically, at time $t_{ABS}-\tau_f$, UE 110 may calculate the UL transmit frequency by $$f_c = \frac{f_0}{1+d_s(t_{ABS}-\tau_f)}.$$

$f_0$ denotes the center frequency, $t_{ABS}$ denotes the reference time, $d_s$ denotes the service link delay drift rate, and $\tau_f$ denotes the feeder link delay.

Alternatively, UE 100 may calculate the UL transmit frequency by subtracting Doppler frequency shift from the center frequency. To be more specific, a reception time at the satellite is calculated as subtracting the feeder link delay from the reference time and may be expressed as $t_{ABS}-\tau_f$. The Doppler frequency shift may be calculate as the center frequency times the service link delay drift rate at the reception time $t_{ABS}-\tau_f$ and may be expressed as $f_0 d_s(t_{ABS}-\tau_f)$. Therefore, the UL transmit frequency $$f_c = \frac{f_0}{1 + d_s(t_{ABS} - \tau_f)}$$

may approximately equal to $f_0-f_0 d_s(t_{ABS}-\tau_f)$.

In some implementations, UE 110 may calculate the UL transmit frequency by subtracting DL Doppler frequency shift and UL Doppler frequency shift from the received frequency of a DL signal. Specifically, UE 110 may obtain the service link delay $\tau_s$ is the one way delay between UE 110 and the NT network node 120 based on the position of the NT network node 120 at time $t_{ABS}$. UE 110 may obtain the service link delay drift rate $d_s$ for the DL Doppler frequency shift at the time $t_{ABA}-2\tau_s-\tau_f$, and obtain the service link delay drift rate $d_s$ for the UL Doppler frequency shift at the time $t_{ABS}-\tau_f$. Thus, the UL transmit frequency $f_0-f_0 d_s(t_{ABS}-\tau_f)$ equals to $f_{DL}-f_0 d_s(t_{ABS}-2\tau_s-\tau_f)-f_0 d_s(t_{ABS}-\tau_f)$.

In some implementations, UE 110 may calculate the UL transmit frequency by subtracting twice the Doppler frequency shift from the received frequency and adding the Doppler frequency variation to the received frequency. In detail, similar to previous implementation, UE 110 may measure the received frequency of the DL signal. UE 110 may further obtain the Doppler frequency drift rate. Then, UE 110 may calculate Doppler frequency shift as the center frequency times the service link delay drift rate at the reception time $t_{ABS}-\tau_f$ and the Doppler frequency shift at the reception time $t_{ABS}-\tau_f$ may be expressed as $f_0 d_s(t_{ABS}-\tau_f)$. Therefore, UE 110 may calculate the UL transmit frequency by $f_c-f_{DL}-2f_0 d_s(t_{ABS}-\tau_f)+f_0\beta 2\tau_s$.

In this implementation, $\beta$ is the Doppler frequency drift rate or derivative of $d_s$ at time $t_{ABS}-\tau_f$ or $t_{ABS}$. The derivative may not be pretty constant during round trip time and changes very slowly, but this allow to calculate the Doppler frequency variation as $f_0\beta 2\tau_s$. Since the Doppler frequency drift rate may be derivative of $d_s$, the UL transmit frequency $f_{DL}-2f_0 d_s(t_{ABS}-\tau_f)+f_0\beta 2\tau_s$ may be approximated as $f_{DL}-2f_0 d_s(t_{ABS}-\tau_f-\tau_s)$. Moreover, the UL transmit frequency $f_{DL}-2f_0 d_s(t_{ABS}-\tau_f-\tau_s)$ may also be expressed as $$f_{DL} - 2f_0 d_s\left(t_{ABS} - \frac{RTD}{2}\right).$$

RTD denotes the round trip delay, and may be calculated as $2\tau_s+2\tau_f$.

According to above, if UE 110 takes center frequency $f_0$ as a reference, then it only need to pre-compensate the Doppler frequency shift at time of satellite reception $f_0 d_s(t_{ABS}-\tau_f)$. In some implementations, if UE takes the DL frequency $f_{DL}$ as a reference, then it needs to pre-compensate twice the Doppler frequency shift at time of satellite reception $2f_0 d_s(t_{ABS}-\tau_f)$ with an additional term $f_0\beta 2\tau_s$ corresponding to the Doppler drift during the round trip to the satellite $2\tau_s$.

In some implementations, if the NT network node 120 or the terrestrial network node 130 signalled a common timing advance (TA) without the feeder link delay, UE 110 may derive the feeder link delay as half the common TA at time $t_{ABS}$. The feeder link delay may be expressed as $$\tau_f = \frac{TA_{common}(t_{ABS})}{2}.$$

Under another proposed schemes in accordance with the present disclosure pertaining to timing compensation/synchronization, each of the UE 110, the NT network node 120 and the terrestrial network node 130 may be configured to perform operations pertaining to the reference time, the common TA, the feeder link delay drift rate, and the service link delay drift rate for timing compensation in NTN communications, as described below.

UE 110 may obtain the common TA and the feeder link delay drift rate. The common TA and the feeder link delay drift rate may be broadcast by the terrestrial network node 130 in SIB. In an event that the SIB is an existing SIB, the common TA and the feeder link delay drift rate may be added to an information element (IE) definition for the existing SIB. In an event that the SIB is a new SIB, a new IE may be defined for the new SIB that includes the common TA and the feeder link delay drift rate.

UE 110 may adjust a sampling rate according to the reference time, the common TA, the feeder link delay drift rate, and the service link delay drift rate. The sampling rate adjustment can be approximated as $$\frac{t - TA}{(1 + d_s)(1 + d_f)},$$

TA is the timing advance, $d_s$ denotes the service link delay drift rate, and $d_f$ denotes the feeder link delay drift rate. The sampling rate adjustment $$\frac{t - TA}{(1 + d_s)(1 + d_f)}$$

approximately equals to $$\frac{t - TA}{1 + d_s + d_f} \text{ or } (t - TA) \times (1 - d_s - d_f) \text{ since } d_s \cdot d_f,$$

$d_s^2$, and $d_f^2$ are very small and can be ignored.

To compensate the delay and delay drift rate on service link and feeder link, baseband signal $x(t)=a(t-TA)$ has to include both TA and sampling rate adjustment, so UE 110 performs a timing compensation through adjusting a baseband signal according to the common TA and the adjusted sampling rate. The baseband signal adjustment may be expressed as $$x(t) = a\left(\frac{t - TA}{(1 + d_s)(1 + d_f)}\right).$$

In some implementations, the feeder link delay drift rate is calculated by the processor based on an ephemeris of the satellite and a position of the network node or based on the common TA. The service link delay drift rate is calculated by the processor based on an ephemeris of the satellite and a position of the network node or based on the common TA.

In some implementations, feeder link drift $d_f$ may not be included. For instance, the base station 130 is on the satellite 120, or part of the base station 130 is on the satellite 120. In these cases, reference point for UL time synchronization is the satellite 120. UE 110 will know about these cases if the common TA is absent or is signalled but equal to zero or a constant value.

In some implementations, If the common TA is signalled as $TA_{common}(t)=f(t)=D_0+D_1 \times t+ \ldots +D_n \times t^n$, the common TA can be assumed to be twice the feeder link delay $TA_{common}(t)=f(t)=2\tau_f(t)$. The common TA is based on the signaling of TA common parameters similar to the common delay drift rate (i.e., the feeder link delay drift), and the common delay drift rate is calculated as $d_f(t)=(D_1+ \ldots +nD_n t^{n-1})/2$.

TA is used to calculate the transmission start time, and the TA has several parts including a close loop TA, a UE specific TA and the common TA. To calculate the transmit time for transmitting uplink signal, UE 110 may receive the closed TA commands from the NT network node 120 or the terrestrial network node 130. UE 110 may calculate the UE specific TA based on a position of the UE 110 itself and an ephemeris of the NT network node 120. The UE specific TA may be calculated as $t_s(t_{ABS}-2\tau_s-\tau_f)+\tau_s(t_{ABS}-\tau_f)$, where $\tau_s(t_{ABS})$ is the one way delay between UE 110 and the NT network node 120 based on the position of the NT network node 120 at time $t_{ABS}$. Thus, the UE specific TA is sum of the service link delay at time $(t_{ABS}-2\tau_s-\tau_f)$ and the service link delay at time $(t_{ABS}-\tau_f)$. Alternatively, UE specific TA may be approximated as $2\tau_s(t_{ABS})-d_s \times 2 \times (\tau_s+\tau_f)$, which equals to $2\tau_s(t_{ABS})-d_s \times RTD$. $2\tau_s(t_{ABS})-d_s \times RTD$ may be approximated as $$2\tau_s\left(t_{ABS} - \frac{RTD}{2}\right).$$

Hence, the UE Specific TA needs to have a correction due to the delay drift during the round trip delay (RTD), $RTD=2\tau_s+2\tau_f=2\tau_s+TA\_common(t_{ABS})$.

UE 110 may further calculate the common TA based on the feeder link delay, the service link delay, the feeder link delay drift rate, and the reference time. Specifically, assuming that the time reference of validity of the feeder link delay/common TA in the terrestrial network node 130, common TA is the TA on the feeder link at the time $t_{ABS}-2\tau_s-2\tau_f$ and the time $t_{ABS}$, and may be expressed as $\tau_f(t_{ABS}-2\tau_s-2\tau_f)+\tau_f(t_{ABS})$. Alternatively, the common TA may be approximated as $$2\tau_f(t_{ABS}) - d_f 2(\tau_s + \tau_f) = 2\tau_f(t_{ABS}) - d_f \times RTD = f\left(t_{ABS} - \frac{RTD}{2}\right).$$

Hence, the common TA needs to have a correction due to the delay drift during the round trip delay, $RTD=2\tau_s+2\tau_f=2\tau_s+TA\_common(t_{ABS})$.

According to above, the transmit time for transmitting uplink signal at the time $t_{ABS}$ is the sum of the close loop TA, the UE specific TA and the common TA.

Illustrative Implementations

Figure 2:
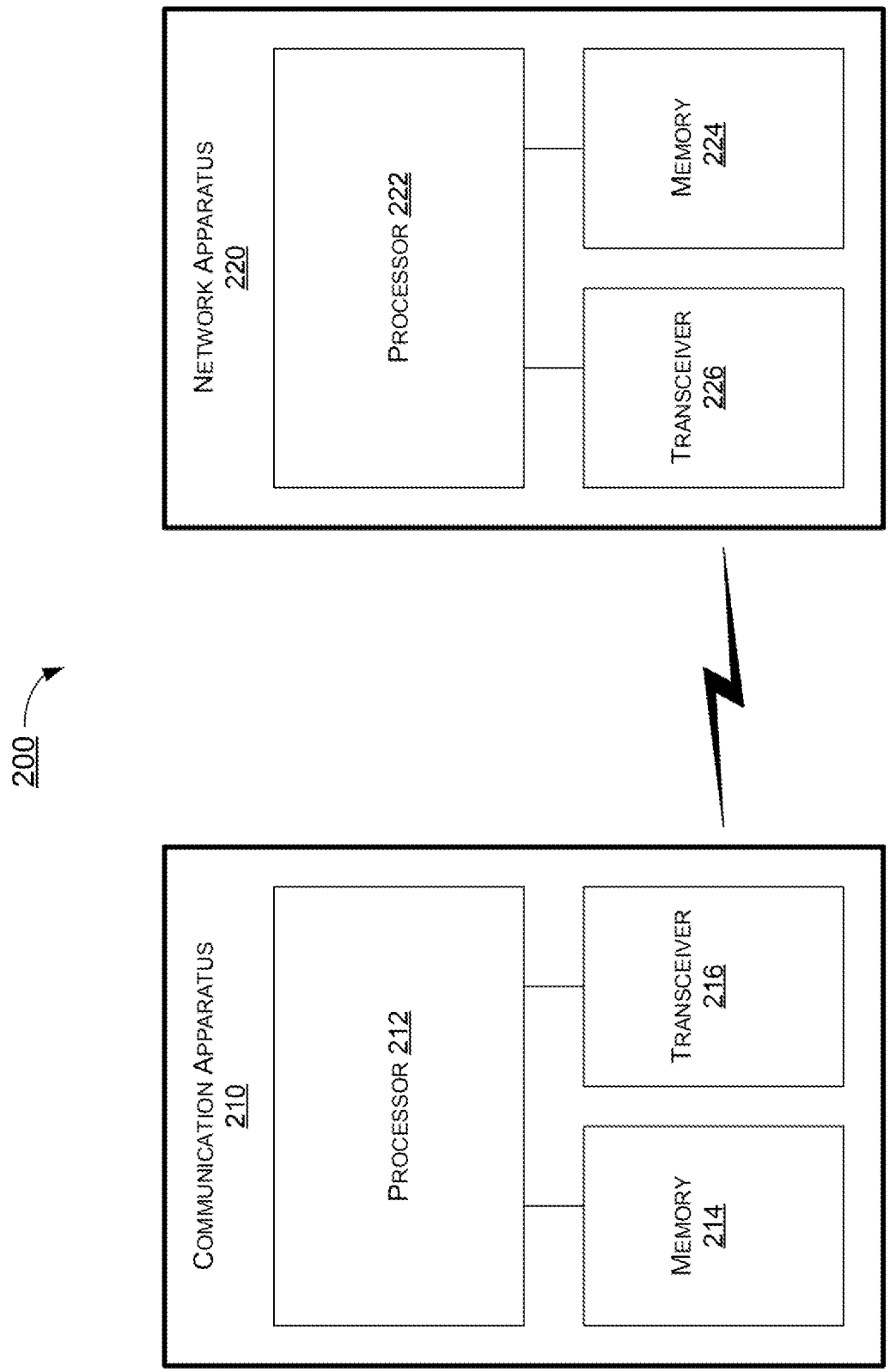
FIG. 2 is a block diagram of an example communication system in accordance with an implementation of the present disclosure.

FIG. 2 illustrates an example communication system 200 having an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to center frequency, reference time, feeder link delay, and service link delay drift rate for uplink frequency pre-compensation in NTN communications, including scenarios/schemes described above as well as processes 300, 400 and 500 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center.

Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus/station, which may be a network node such as a base station, a small cell, a router, a gateway or a satellite. For instance, network apparatus 220 may be implemented in an eNodeB in an LTE, in a gNB in a 5G, NR, 6G, IoT, NB-IoT, IIoT, or in a satellite in an NTN network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

Each of communication apparatus 210 and network apparatus 220 may be a communication entity capable of communicating with each other using various proposed schemes in accordance with the present disclosure. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node or base station (e.g., NT network node 120 or terrestrial network node 130) of a communication network (e.g., network 120). It is also noteworthy that, although the example implementations described below are provided in the context of NTN communications, the same may be implemented in other types of networks.

Under a proposed scheme pertaining to center frequency, reference time, feeder link delay, and service link delay drift rate for uplink frequency pre-compensation in NTN communications in accordance with the present disclosure, with communication apparatus 210 implemented in or as UE 110 and network apparatus 220 implemented in or as NT network node 120 or terrestrial network node 130 in network environment 100.

Processor 212 of the communication apparatus 210 may obtain a center frequency and a reference time of nonterrestrial network (NTN) via transceiver 216 from a NT network node 120 (e.g., satellite). Processor 212 may further obtain a feeder link delay of a feeder link between network node 130 (e.g., base station) and a satellite 120, and obtain a service link delay drift rate of a service link between the apparatus 110 and the satellite 120. Processor 212 may perform UL frequency pre-compensation through calculating an uplink transmit frequency according to the center frequency, the reference time, the feeder link delay, and the service link delay drift rate.

In some implementations, processor 212 may calculate a reception time at the satellite 120 by subtracting the feeder link delay from the reference time. Then, processor 212 may calculate a Doppler frequency shift as the center frequency times the service link delay drift rate times the reception time. In performing UL frequency pre-compensation, processor 212 may calculate the UL transmit frequency by subtracting the Doppler frequency shift from the center frequency.

In some implementations, processor 212 may measure a received frequency of a DL signal. Processor 212 may further obtain a service link delay and a Doppler frequency drift rate. Processor 212 may calculate a Doppler frequency shift as the center frequency times the service link delay drift rate times the reception time. Processor 212 may calculate a Doppler frequency variation as the center frequency times the Doppler frequency drift rate times twice the service link delay. In performing UL frequency pre-compensation, processor 212 may calculate the UL transmit frequency by subtracting twice the Doppler frequency shift from the received frequency and adding the Doppler frequency variation to the received frequency.

In some implementations, processor 212 may obtain the common TA via transceiver 216. Processor 212 may further derive the feeder link delay as half the common TA.

In performing the timing compensation processor 212 may involve certain operations. For instance, processor 212 may obtain the common TA and a feeder link delay drift rate via transceiver 216. Processor 212 may further adjust a sampling rate according to the reference time, the common TA, the feeder link delay drift rate, and the service link delay drift rate. Additionally, processor 212 may adjust a baseband signal according to the common TA and the adjusted sampling rate.

In some implementations, processor 212 may calculate the feeder link delay drift rate based on an ephemeris of the satellite and a position of the network node.

In some implementations, processor 212 may calculate the feeder link delay drift rate based on the common TA.

In performing UL frequency pre-compensation, processor 212 may involve certain operations. For instance, processor 212 may receive a close loop TA from the network node 130 via the transceiver 218. Processor 212 may calculate a UE specific TA based on a position of the apparatus 110 and an ephemeris of the satellite 120. Processor 212 may calculate the common TA based on the feeder link delay, the service link delay, the feeder link delay drift rate, and the reference time. Processor 212 may calculate a transmit time for transmitting an uplink signal according to the close loop TA, the UE specific TA, and the common TA.

Illustrative Processes

Figure 3:
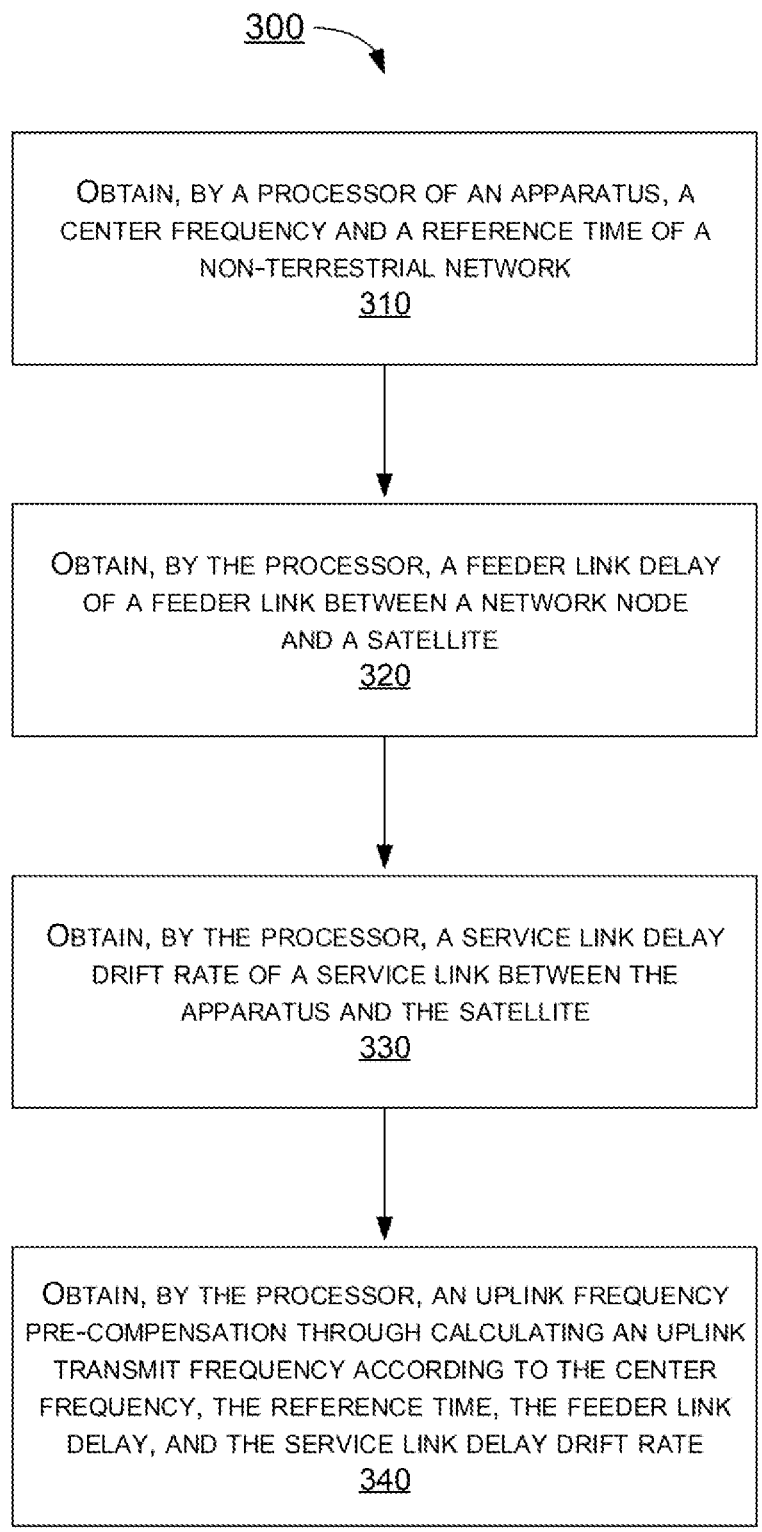
FIG. 3 is a flowchart of an example process in accordance with an implementation of the present disclosure.

FIG. 3 illustrates an example process 300 in accordance with an implementation of the present disclosure. Process 300 may be an example implementation of schemes described above, whether partially or completely, with respect to the center frequency, the reference time, the feeder link delay, and the service link delay drift rate for UL frequency pre-compensation with the present disclosure. Process 300 may represent an aspect of implementation of features of communication apparatus 210. Process 300 may include one or more operations, actions, or functions as illustrated by one or more of blocks 310, 320, 330 and 340.

Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210.

Process 300 may begin at block 310. At block 310, process 300 may involve processor 212 of communication apparatus 210 obtaining, via transceiver 216, the center frequency and the reference time of non-terrestrial network. Process 300 may proceed from block 310 to block 320.

At block 320, process 300 may involve processor 212 obtaining, via transceiver 216, a feeder link delay of a feeder link between a network node. Process 300 may proceed from block 320 to block 330.

At block 330, process 300 may involve processor 212 obtaining, via transceiver 216, a service link delay drift rate of a service link between the apparatus and the satellite. Process 300 may proceed from block 330 to block 340.

At block 340, process 300 may involve processor 212 performing, via transceiver 216, an uplink frequency pre-compensation through calculating an uplink transmit frequency according to the center frequency, the reference time, the feeder link delay, and the service link delay drift rate.

In some implementations, a reception time at the satellite is calculated as subtracting the feeder link delay from the reference time.

In some implementations, process 300 may involve processor 212 calculating a Doppler frequency shift as the center frequency times the service link delay drift rate times the reception time and calculating the UL transmit frequency by subtracting the Doppler frequency shift from the center frequency.

In some implementations, in obtaining the feeder link delay, process 300 may involve processor 212 performing certain operations. For instance, process 300 may involve processor 212 obtaining a common timing advance (TA). Then, process 300 may involve processor 212 deriving the feeder link delay as half the common TA.

Figure 4:
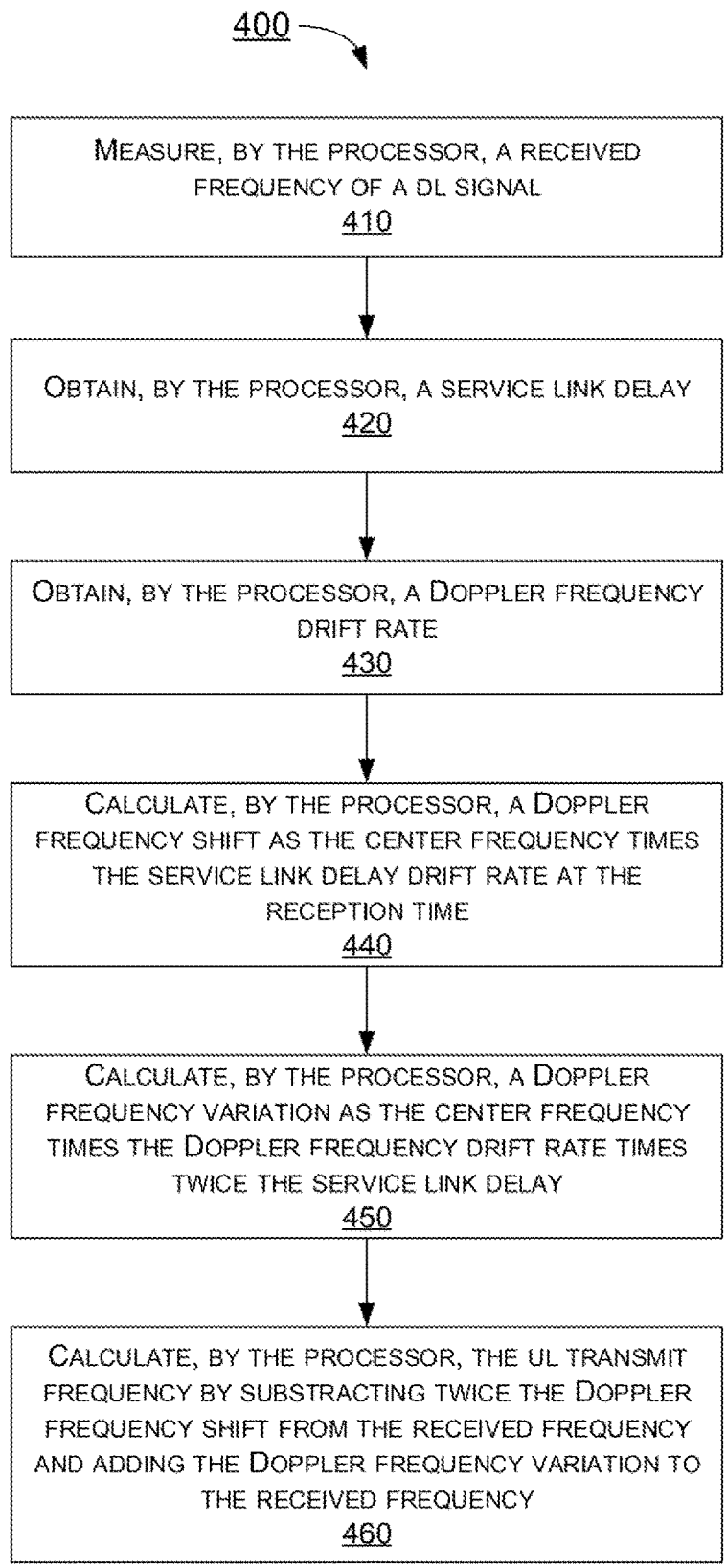
FIG. 4 is a flowchart of an example process in accordance with an implementation of the present disclosure.

FIG. 4 illustrates an example process 400 in accordance with an implementation of the present disclosure. Process 400 may be an example implementation of schemes described above, whether partially or completely, with respect to the DL signal, the service link delay, the Doppler frequency drift rate, the Doppler frequency shift, and the Doppler frequency variation for UL timing compensation with the present disclosure. Process 400 may represent an aspect of implementation of features of communication apparatus 210. Process 400 may include one or more operations, actions, or functions as illustrated by one or more of blocks 410, 420, 430, 440, 450, and 460.

Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210.

Process 400 may begin at block 410. At block 410, process 400 may involve processor 212 of communication apparatus 210 measuring, via transceiver 216, a received frequency of a DL signal. Process 400 may proceed from block 410 to block 420.

At block 420, process 400 may involve processor 212 obtaining a service link delay. Process 400 may proceed from block 420 to block 430. At block 430, process 400 may involve processor 212 obtaining a Doppler frequency drift rate. Process 400 may proceed from block 430 to block 440. It shall be noted that the order of block 410, 420 and block 430 may be exchanged.

At block 440, process 400 may involve processor 212 calculating a Doppler frequency shift as the center frequency times the service link delay drift rate at the reception time. Process 400 may proceed from block 440 to block 450.

At block 450, process 400 may involve processor 212 calculating a Doppler frequency variation as the center frequency times the Doppler frequency drift rate times twice the service link delay. Process 400 may proceed from block 450 to block 460.

At block 460, process 400 may involve processor 212 calculating the UL transmit frequency by subtracting twice the Doppler frequency shift from the received frequency and adding the Doppler frequency variation to the received frequency.

Figure 5:
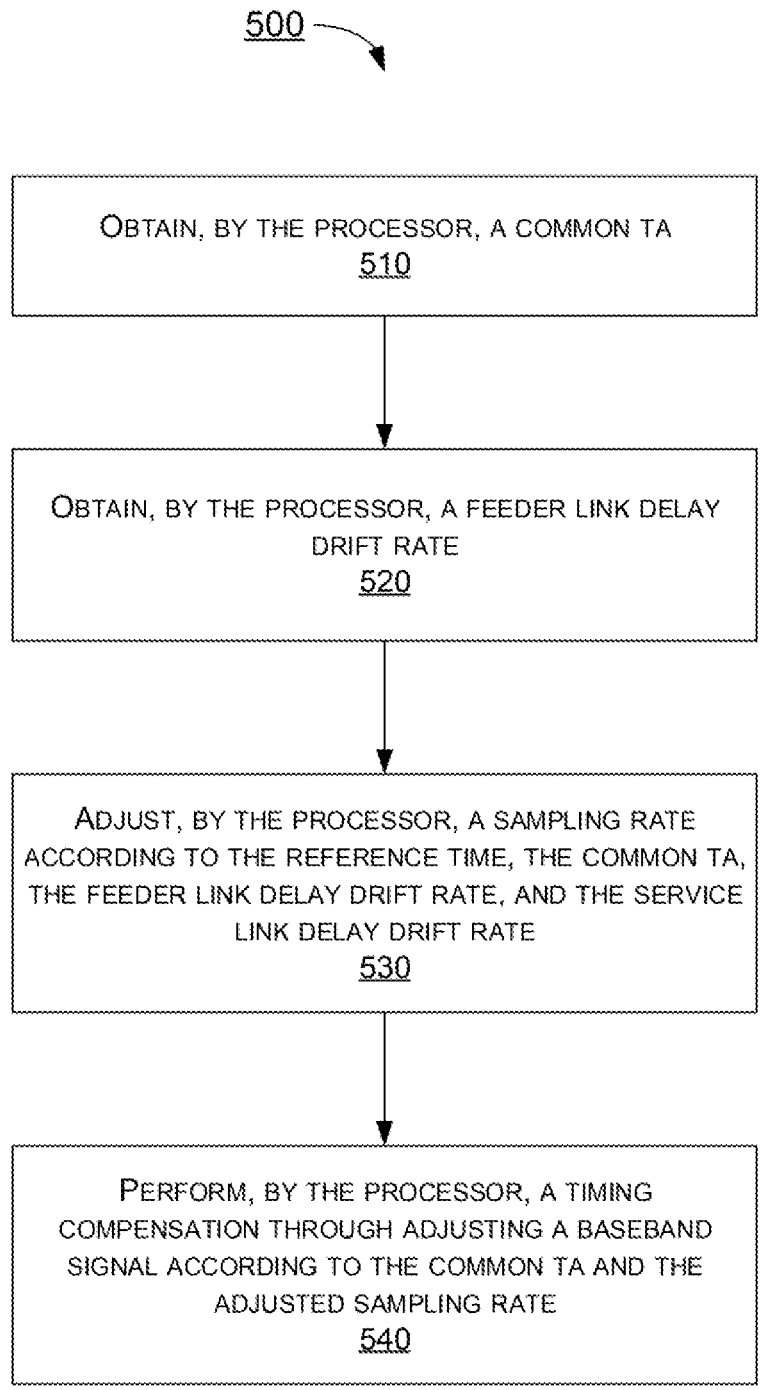
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to the common TA, the feeder link delay drift rate, the sampling rate, and the baseband signal for UL timing compensation with the present disclosure. Process 500 may represent an aspect of implementation of features of communication apparatus 210. Process 500 may include one or more operations, actions, or functions as illustrated by one or more of blocks 510, 520, 530, and 540.

Although illustrated as discrete blocks, various blocks of process 400 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 210 or any suitable UE or machine type devices. Solely for illustrative purposes and without limitation, process 500 is described below in the context of communication apparatus 210.

Process 500 may begin at block 510. At block 510, process 500 may involve processor 212 of communication apparatus 210 obtaining a common TA. Process 500 may proceed from block 510 to block 520.

At block 520, process 500 may involve processor 212 obtaining a feeder link delay drift rate. Process 500 may proceed from block 520 to block 530.

At block 530, process 500 may involve processor 212 adjusting a sampling rate according to the reference time, the common TA, the feeder link delay drift rate, and the service link delay drift rate. Process 500 may proceed from block 530 to block 540.

At block 530, process 500 may involve processor 212 performing a timing compensation through adjusting a baseband signal according to the common TA and the adjusted sampling rate.

In some implementations, process 500 may involve processor 212 calculating the feeder link delay drift rate based on an ephemeris of the satellite and a position of the network node.

In some implementations, process 500 may involve processor 212 calculating the feeder link delay drift rate based on the common TA.

In some implementations, in performing timing compensation, process 500 may involve processor 212 performing certain operations. For instance, process 500 may involve processor 212 receiving a close loop TA from the network node. Additionally, process 500 may involve processor 212 calculating a UE specific TA based on a position of the apparatus and an ephemeris of the satellite. Moreover, process 500 may involve processor 212 calculating the common TA based on the feeder link delay, the service link delay, the feeder link delay drift rate, and the reference time. Furthermore, calculating a transmit time for transmitting an uplink signal according to the close loop TA, the UE specific TA, and the common TA.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    obtaining, by a processor of an apparatus, a center frequency and a reference time of a non-terrestrial network (NTN);
    obtaining, by the processor, a feeder link delay of a feeder link between a network node and a satellite;
    obtaining, by the processor, a service link delay drift rate of a service link between the apparatus and the satellite; and
    performing, by the processor, an uplink (UL) frequency pre-compensation through calculating an uplink transmit frequency according to the center frequency, the reference time, the feeder link delay, and the service link delay drift rate.

2. The method of claim 1, wherein a reception time at the satellite is calculated as subtracting the feeder link delay from the reference time.

3. The method of claim 2, further comprising:
    calculating, by the processor, a Doppler frequency shift as the center frequency times the service link delay drift rate at the reception time; and calculating, by the processor, the UL transmit frequency by subtracting the Doppler frequency shift from the center frequency.

4. The method of claim 2, further comprising:
measuring, by the processor, a received frequency of a downlink (DL) signal;
obtaining, by the processor, a service link delay;
obtaining, by the processor, a Doppler frequency drift rate;
calculating, by the processor, a Doppler frequency shift as the center frequency times the service link delay drift rate at the reception time;
calculating, by the processor, a Doppler frequency variation as the center frequency times the Doppler frequency drift rate times twice the service link delay; and
calculating, by the processor, the UL transmit frequency by subtracting twice the Doppler frequency shift from the received frequency and adding the Doppler frequency variation to the received frequency.

5. The method of claim 1, further comprising:
obtaining, by the processor, a common timing advance (TA); and
deriving, by the processor, the feeder link delay as half the common TA.

6. The method of claim 1, further comprising:
obtaining, by the processor, a common timing advance (TA);
obtaining, by the processor, a feeder link delay drift rate; and
adjusting, by the processor, a sampling rate according to the reference time, the common TA, the feeder link delay drift rate, and the service link delay drift rate.

7. The method of claim 6, further comprising:
performing, by the processor, a timing compensation through adjusting a baseband signal according to the common TA and the adjusted sampling rate.

8. The method of claim 6, wherein the feeder link delay drift rate is calculated by the processor based on an ephemeris of the satellite and a position of the network node or based on the common TA.

9. The method of claim 6, wherein the feeder link delay drift rate is calculated by the processor an ephemeris of the satellite and a position of the network node or based on the common TA.

10. The method of claim 6, further comprising:
receiving, by the processor, a close loop timing advance (TA) from the network node;
calculating, by the processor, a user equipment (UE) specific TA based on a position of the apparatus and an ephemeris of the satellite;
calculating, by the processor, the common TA based on the feeder link delay, the service link delay, the feeder link delay drift rate, and the reference time; and
calculating, by the processor, a transmit time for transmitting an uplink signal according to the close loop TA, the UE specific TA, and the common TA.

11. An apparatus, comprising:
a transceiver configured to wirelessly communicate with a non-terrestrial network (NTN); and
a processor coupled to the transceiver and configured to perform operations comprising:
obtaining, via the transceiver, a center frequency and a reference time of a non-terrestrial network (NTN);
obtaining, via the transceiver, a feeder link delay of a feeder link between a network node and a satellite;
obtaining, via the transceiver, a service link delay drift rate of a service link between the apparatus and the satellite; and
performing an uplink (UL) frequency pre-compensation through calculating an uplink transmit frequency according to the center frequency, the reference time, the feeder link delay, and the service link delay drift rate.

12. The apparatus of claim 11, wherein a reception time at the satellite is calculated as subtracting the feeder link delay from the reference time.

13. The apparatus of claim 12, wherein the processor further performs operations comprising:
calculating a Doppler frequency shift as the center frequency times the service link delay drift rate at the reception time; and
calculating the UL transmit frequency by subtracting the Doppler frequency shift from the center frequency.

14. The apparatus of claim 12, wherein the processor further performs operations comprising:
measuring a received frequency of a downlink (DL) signal;
obtaining, via the transceiver, a service link delay;
obtaining a Doppler frequency drift rate;
calculating a Doppler frequency shift as the center frequency times the service link delay drift rate at the reception time;
calculating a Doppler frequency variation as the center frequency times the Doppler frequency drift rate times twice the service link delay; and
calculating the UL transmit frequency by subtracting twice the Doppler frequency shift from the received frequency and adding the Doppler frequency variation to the received frequency.

15. The apparatus of claim 11, wherein the processor further performs operations comprising:
obtaining, via the transceiver, a common timing advance (TA); and
deriving the feeder link delay as half the common TA.

16. The apparatus of claim 11, wherein the processor further performs operations comprising:
obtaining, via the transceiver, a common timing advance (TA);
obtaining, via the transceiver, a feeder link delay drift rate; and
adjusting a sampling rate according to the reference time, the common TA, the feeder link delay drift rate, and the service link delay drift rate.

17. The apparatus of claim 16, wherein the processor further performs operations comprising:
performing a timing compensation through adjusting a baseband signal according to the common TA and the adjusted sampling rate.

18. The apparatus of claim 16, wherein the feeder link delay drift rate is calculated by the processor based on an ephemeris of the satellite and a position of the network node or based on the common TA.

19. The apparatus of claim 16, wherein the feeder link delay drift rate is calculated by the processor an ephemeris of the satellite and a position of the network node or based on the common TA.

20. The apparatus of claim 16, wherein the processor further performs operations comprising:
receiving, via the transceiver, a close loop timing advance (TA) from the network node;

calculating a user equipment (UE) specific TA based on a position of the apparatus and an ephemeris of the satellite;
calculating the common TA based on the feeder link delay, the service link delay, the feeder link delay drift rate, and the reference time; and
calculating a transmit time for transmitting an uplink signal according to the close loop TA, the UE specific TA, and the common TA.

* * * * *